F. J. MEDINE.
CUT-OUT.
APPLICATION FILED MAR. 30, 1920.
1,394,207.
Patented Oct. 18, 1921.
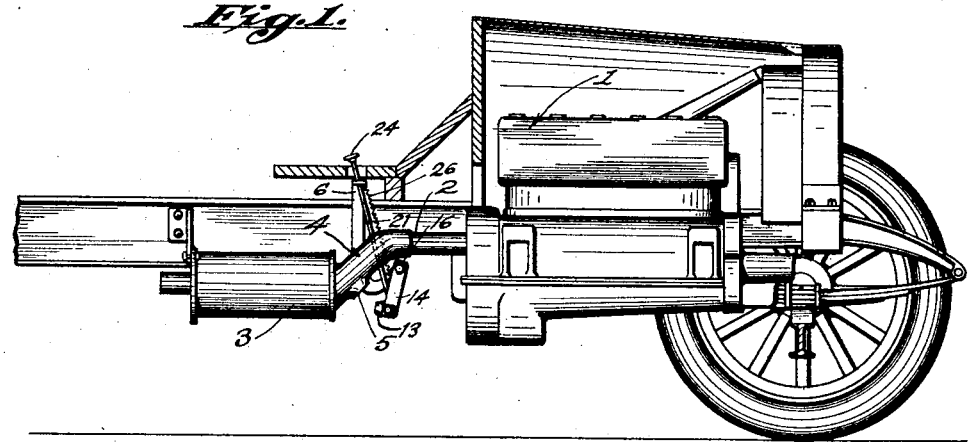
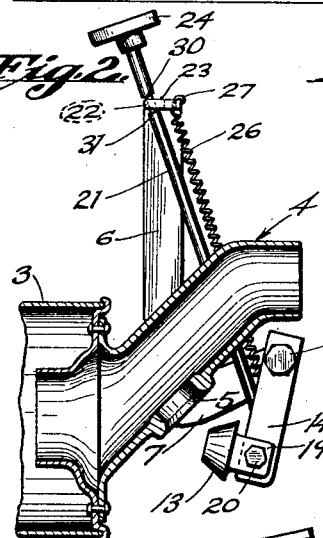
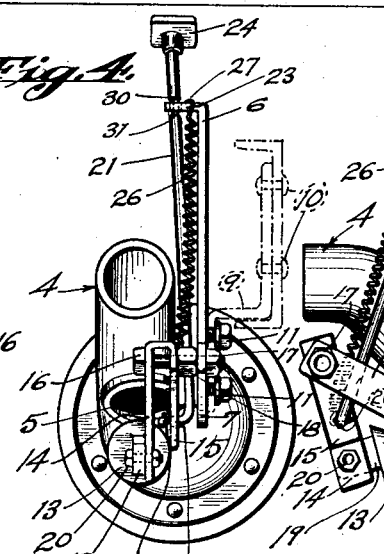
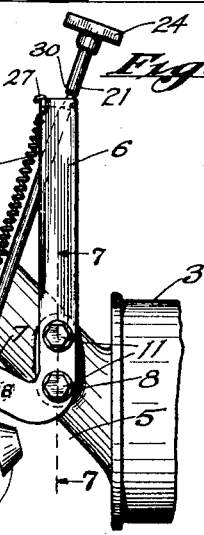
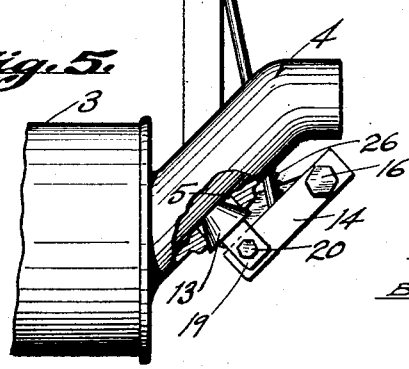
Inventor:
FRANK J. MEDINE.
BY Hazard & Miller
Attorneys

UNITED STATES PATENT OFFICE.

FRANK J. MEDINE, OF LOS ANGELES, CALIFORNIA, ASSIGNOR OF ONE-HALF TO HARRY S. LONGFELLOW, OF LOS ANGELES, CALIFORNIA.

CUT-OUT.

1,394,207. Specification of Letters Patent. Patented Oct. 18, 1921.

Application filed March 30, 1920. Serial No. 369,852.

*To all whom it may concern:*

Be it known that I, FRANK J. MEDINE, a citizen of the United States, residing at Los Angeles, in the county of Los Angeles and State of California, have invented new and useful Improvements in Cut-Outs, of which the following is a specification.

This invention is a cut-out such as is employed in the exhaust pipe from an automobile engine, and has for its object the provision of simple but efficient means for normally closing the cut-out and for opening the latter when found desirable.

It is a further object of the invention to provide means for releasably retaining the cut-out in its open position and for automatically closing the cut-out when released.

Further objects of the invention will become apparent from the following description of the accompanying drawings in which;

Figure 1 is a side elevation of a portion of an automobile having my improved cut-out applied thereto, the side of the automobile being broken away to more clearly show the invention.

Fig. 2 is a longitudinal vertical section through the exhaust pipe of the automobile showing the mechanism of the cut-out in side elevation with the cut-out open.

Fig. 3 is a side elevation of the exhaust pipe and the improved cut-out taken from the opposite side of the automobile and showing the cut-out in open position.

Fig. 4 is a front elevation of the section of the exhaust pipe having the cut-out therein, and showing the mechanism of the latter in front elevation with the cut-out in open position.

Fig. 5 is a side elevation of the exhaust pipe and the cut-out taken from the same side of the machine as Fig. 2, and showing the cut-out closed.

Fig. 6 is a fragmentary perspective view of the means for holding the operating rod of the cut-out with the cut-out in open position.

Fig. 7 is a transverse section on the line 7—7 of Fig. 3 showing the supporting means for the mchanism of the improved cut-out.

In the drawing the improved cut-out is illustrated as employed in the exhaust pipe from an automobile engine, although it will be obvious that the invention is readily applicable to various other engines and the like. The automobile engine is represented at 1 and is provided with the exhaust pipe 2 and muffler 3, the exhaust pipe and the muffler being connected by the coupling pipe 4 in which the cut-out opening 5 is provided.

The mechanism for opening and closing the cut-out comprises a supporting bracket having a movable arm carried thereby and provided with a closure head, and an operating connection for swinging the closure head to open position, and a yieldable connection between the movable arm and the supporting bracket normally holding the closure head in closed position.

The supporting bracket for the cut-out mechanism, preferably, includes an upright arm 6 and a forwardly projecting arm 7 at its lower end. This bracket, preferably, rests against the cut-out pipe section 4, which, for this purpose, may be provided with a lug having a bearing surface 8, the supporting bracket being, preferably, received between the bearing surface and a depending arm 9 secured to the frame of the automobile as shown at 10. The supporting bracket may be held in this position by screw bolts 11 extending through suitable alined apertures 12 formed in the supporting bracket and the arm 9 and having threaded engagement with the bearing lug 8 formed upon the pipe section 4.

The closure head 13 arranged to seat within the cut-out opening 5 may be carried by a movable arm swingably mounted upon the bracket arm 7. This arm is shown as a U-shaped member having the arms 14 and 15. The arms are provided adjacent the base of the —U— with suitable bearing apertures through which a bolt 16 extends, the bolt projecting through the outer end of bracket arm 7 and having the usual nut 17 upon its end for retaining the bolt in position. A spacing nut 18 is, preferably, threaded upon the bolt 16 between the movable arm and the bracket 7. The closure head 13 is illustrated as mounted upon the lower end of the outside depending arm 14, the closure head, for this purpose, being provided with a lug 19, and a bolt 20 being shown as received through this lug and the end of the arm 14. It will be understood that the parts are so alined that when the movable arm is swung rearwardly the closure head will seat in the cut-out opening 5, and when the movable arm is swung forwardly and downwardly the closure head will be moved away from the cut-out opening to permit the escape therethrough of the exhaust gases from engine 1.

The operating means for the cut-out may comprise the following mechanism:

An operating rod 21 extends through an aperture 22 provided in the inturned upper end 23 of bracket 6, the upper end of this operating rod, preferably, extending through the floor boards of the automobile and terminating in a foot pedal 24. The lower end of this operating rod is connected to the movable arm carrying the closure head 13. For this purpose the end of the operating rod may comprise an inturned portion 25 extending through an aperture in the depending arm 15, the parts being so arranged that when the operating rod 12 is depressed the movable arm will be swung to open the cut-out, and when the operating rod is moved in the reverse direction the movable arm will be swung so that the closure head of the cut-out will be seated in the cut-out opening.

Means are provided for normally yieldably moving the movable arm so as to seat the closure head 13, such means being shown as comprising a spring 26 shown as a coiled spring connected at its respective ends to the bracket 6 and to the lower end of the operating rod 21. As an instance of this arrangement the upper end of the spring may be hooked in the inturned upper end 23 of bracket 6, as shown at 27, and the lower end of the spring may be hooked in the inturned lower end 15 of the operating rod 21, as shown at 28.

The operating mechanism is, preferably, provided with means whereby the operating rod, when depressed to open the cut-out, may be releasably retained in its open position. For this purpose the operating rod, where it passes through the aperture 22 in the bracket end 23, is, preferably, contracted as shown at 29 to provide the oppositely disposed collars 30 and 31 upon the operating rod. The aperture 22 through which the operating rod is arranged to freely slide is provided with a laterally extending slot 32 into which the contracted portion 29 of the operating rod may be freely moved, but against the walls of which the shoulders 30 and 31 will impinge to limit the longitudinal movement in reverse directions of the operating rod.

When the cut-out is closed the operating rod 21 is at its upper limit of movement, as shown in Fig. 5, with the collars 30 and 31 above the apertured end 23 of the supporting bracket. When, now, the operating rod is depressed to open the cut-out the contracted portion 29 of the rod is moved to a position opposite the lateral slot 32 and by a slight lateral movement of the foot pedal of the operating rod the contracted portion 29 will be moved into the slot 32. The pressure upon the foot pedal may then be released, the cut-out being retained in its open position by engagement of the collar 31 against the under side of the walls of slot 32 to prevent upward longitudinal movement of the operating rod under the influence of spring 26.

When it is desired to close the cut-out the foot lever 24 is moved laterally a short distance in the reverse direction to move the operating rod from the slot 32 into the aperture 22. Pressure upon the foot pedal being then released the operating rod will be moved upwardly under the influence of spring 26 to close the cut-out.

Various changes may be made without departing from the spirit of the invention as claimed.

What is claimed is:

1. A cut-out comprising a supporting bracket, a movable arm swingably mounted on said bracket and having a closure head at its free end, an operating rod having a connection with said movable arm for swinging the latter to move its closure head to open position, means for engaging said operating rod on said bracket for retaining the closure head in open position, and means for yieldably swinging said movable arm so that its closure head is in closed position.

2. A cut-out comprising a supporting bracket; a movable arm swingably mounted upon said supporting bracket and having a closure head at its free end; an operating rod having a connection with said movable arm to swing the latter so that its closure head is in open position, said operating rod having a retaining shoulder, said bracket having an aperture through which said rod is freely slidable; and a reduced slot extending laterally therefrom into which said rod is adapted to be moved so that said shoulder abuts against said bracket to retain said rod with said closure head in open position.

3. A cut-out comprising a supporting bracket; a movable arm swingably mounted upon said supporting bracket and having a closure head at its free end; an operating rod having a connection with said movable arm to swing the latter so that its closure head is in open position, said operating rod having a retaining shoulder, said bracket having an aperture through which said rod is freely slidable, a reduced slot extending laterally therefrom into which said rod is adapted to be moved so that said shoulder abuts against said bracket to retain said rod with said closure head in open position; and a yieldable connection between said rod and bracket normally urging said rod in the direction to move the closure head of the movable arm to closed position.

4. The combination with an internal combustion engine exhaust pipe having an inclined portion in which is formed an opening, of a substantially L-shaped bracket secured to the pipe adjacent to said opening, an arm pivoted on the shorter leg of said bracket, a head carried by said arm adapted to close the opening in the inclined portion of the exhaust, and arm actuating means adapted to interlock with the longer arm of the bracket for retaining said head-carrying arm in open position.

5. The combination with an internal combustion engine exhaust pipe having an inclined portion in which is formed an opening, of a substantially L-shaped bracket secured to the pipe adjacent to said opening, an arm pivoted on the shorter leg of said bracket, a head carried by said arm adapted to close the opening in the inclined portion of the exhaust, a rod pivotally connected to said head-carrying arm and adapted to interlock with the longer arm of the bracket for retaining said head-carrying arm in open position, and a spring connected to said head carrying arm and normally tending to move the same into closed position.

In testimony whereof I have signed my name to this specification.

FRANK J. MEDINE.